US009342852B1

(12) United States Patent
Nagaraj et al.

(10) Patent No.: US 9,342,852 B1
(45) Date of Patent: May 17, 2016

(54) VISUAL INDICATORS FOR ACCOUNT ACCESS IN A SOCIAL NETWORK

(71) Applicant: Google Inc., Mountain View, CA (US)

(72) Inventors: Karthik Murili Nagaraj, Livermore, CA (US); Dennis Troper, Los Altos, CA (US); Pavan Desikan, Palo Alto, CA (US); Gustavo Gonçalves Mesquita Moura, Belo Horizonte (BR); Charles H. Warren, San Francisco, CA (US); Barbara Veloso Bacharach, Funcionários (BR)

(73) Assignee: GOOGLE INC., Mountain View, CA (US)

( * ) Notice: Subject to any disclaimer, the term of this patent is extended or adjusted under 35 U.S.C. 154(b) by 111 days.

(21) Appl. No.: 13/667,999

(22) Filed: Nov. 2, 2012

Related U.S. Application Data

(60) Provisional application No. 61/556,155, filed on Nov. 4, 2011.

(51) Int. Cl.
*G06Q 50/00* (2012.01)

(52) U.S. Cl.
CPC ..................................... *G06Q 50/01* (2013.01)

(58) Field of Classification Search
CPC ... G06F 21/31; G06F 3/0481; G06F 3/04886; G06F 21/36; H04L 29/0809
See application file for complete search history.

(56) References Cited

U.S. PATENT DOCUMENTS

| 7,321,877 | B2* | 1/2008 | McKegney et al. | 705/51 |
| 7,966,496 | B2* | 6/2011 | Ellmore | 713/182 |
| 8,595,146 | B1* | 11/2013 | Liew | 705/319 |
| 2004/0230831 | A1* | 11/2004 | Spelman et al. | 713/201 |
| 2008/0040442 | A1* | 2/2008 | Fieldman | 709/207 |
| 2008/0104495 | A1* | 5/2008 | Craig | 715/205 |
| 2009/0076928 | A1* | 3/2009 | Hjertonsson et al. | 705/26 |
| 2009/0125521 | A1* | 5/2009 | Petty | 707/9 |
| 2010/0131392 | A1* | 5/2010 | Archer et al. | 705/27 |
| 2010/0269158 | A1* | 10/2010 | Ehler et al. | 726/4 |
| 2011/0041082 | A1* | 2/2011 | Nguyen | 715/752 |

OTHER PUBLICATIONS

Author: Phyllis Khare Title: How to use secret facebook groups to enhance your business Date: Oct. 6, 2011.*

\* cited by examiner

*Primary Examiner* — Jeffrey A Gaffin
*Assistant Examiner* — Mandrita Brahmachari
(74) *Attorney, Agent, or Firm* — Lowenstein Sandler LLP

(57) ABSTRACT

A method includes receiving login with a first identity. The first identity is associated with a first set of privileges. The reception of login with the first identity enables a first presentation of content associated with a first user account. The content is displayed on a page that has a visual indicator identifying the first user account. The method further includes receiving an interactive input in a location associated with the visual indicator. The received interaction input causes an identity selection menu to be generated on the page. When selection of a second identity other than the first identity is received, the method includes enabling a second set of privileges associated with the second identity. The reception of selection with the second identity enables a second presentation of content associated with a second user account.

22 Claims, 10 Drawing Sheets

Fig. 4

VISUAL INDICATORS FOR ACCOUNT ACCESS IN A SOCIAL NETWORK

CLAIM OF PRIORITY

This patent application claims the benefit of and priority, under 35 U.S.C. §119(e), to U.S. Provisional Application No. 61/556,155, filed on Nov. 4, 2011, and titled "Visual Indicators For Account Access In A Social Network", which is incorporated by reference herein in its entirety.

BACKGROUND

The electronic messaging capability provided by social networks has opened new forms for communicating electronic messages in today's society, making it easier for people to communicate with each other, as well as providing new vehicles for communicating electronic messages between people and businesses, or with other community groups. As people's interest in using social networks for communicating electronic messages has grown, so has the interest of businesses in using social networks to communicate with people.

SUMMARY

Various implementations of the present disclosure provide methods, systems, and computer programs for providing visual indicators for account access in a social network. It should be appreciated that the implementations of the present disclosure can be implemented in numerous ways, e.g., a process, an apparatus, a system, a device, a method on a computer readable medium, etc. Several implementations of the present disclosure are described below.

In some implementations, a social network is provided. The social network allows a person to switch from a personal account to an administrative account and vice versa by selecting an entry in a selection menu. When accounts are changed, there is a change in presentation of content that is displayed on a social network page. The selection menu allows a person to seamlessly switch between user accounts in a social network.

In a number of implementations, a method for managing a social network is described. The social network includes a plurality of user accounts. The method includes receiving login with a first identity. The first identity is associated with a first set of privileges. The reception of login with the first identity enables a first presentation of content associated with a first user account. The content is displayed on a page. The page has a visual indicator identifying the first user account. The method further includes receiving an interactive input in a location associated with the visual indicator. The received interaction input causes an identity selection menu to be generated on the page. When selection of a second identity other than the first identity is received, the method includes enabling a second set of privileges associated with the second identity. The second set of privileges is different than the first set of privileges. The reception of selection with the second identity enables a second presentation of content associated with a second user account. The second presentation is different than the first presentation. The method is performed by a processor.

These or other implementations may include one or more of the following features. For example, in various implementations, the methods include receiving login after authenticating the first identity. As another example, in a number of implementations, the first set of privileges includes access to a plurality of functions. The plurality of functions includes maintaining associations with one or more user accounts. As yet another example, in some implementations, the methods include enabling a presentation of content associated with the first identity. As another example, in a number of implementations, the methods include enabling a presentation of multimedia. The multimedia includes an image, a video, an animation, or text. The multimedia is associated with the first identity.

As another example, in various implementations, the methods include receiving an input indicating a selection by a user. The user manages the first user account and the second user account. As yet another example, in some implementations, the selection menu includes a name of the first user account and a name of the second user account. As another example, in a number of implementations, the second set of privileges includes access to a plurality of functions. The plurality of functions includes maintaining one or more associations with one or more other entity accounts via the Internet. As yet another example, in some implementations, the methods include enabling a presentation of content that is associated with the second identity.

As another example, in various implementations, the method includes enabling a presentation of multimedia. The multimedia includes an image, a video, an animation, or text. The multimedia is associated with the second identity.

In some implementations, a method for managing a social network is described. The method includes receiving login with an identity. The identity identifies an entity. The method includes presenting an administrative access page upon receiving the login. The method further includes receiving an assignment to access to a user account. The receiving operation is performed via the administrative access page. The user account is related to a social networking website. The method includes notifying a user of the assignment in response to receiving the assignment. The method also includes determining whether an acceptance of the assignment is received in response to the notification. The method includes configuring a user identity option corresponding to the user account in response to receiving the acceptance. The method includes uploading the user identity option to the social networking website. The method includes activating a user identity profile upon configuring the user identity option.

These or other implementations may include one or more of the following features. For example, in some implementations, the methods include receiving an authorization to access the user account. As another example, in various implementations, the administrative account is configured to be accessed via the social networking website. As yet another example, in several implementations, the methods include sending an electronic messaging notification, e.g., email notification, or an instant message notification to the user account. As another example, in some implementations, the methods include providing one or more graphical elements associated with the user identity option to the social networking website. As yet another example, in several implementations, the user identity option includes multimedia. The multimedia includes an image, text, an animation, or a video. As another example, in some implementations, the methods include designating the user identity profile as active within an entity account.

In a number of implementations, a computer system is described. The computer system includes a memory device configured to store information. The computer system further includes a processor coupled with the memory. The processor is used for receiving login with a first identity. The first identity is associated with a first set of privileges. The processor is used for rendering content associated with a first user account. The content associated with the first user account is rendered on a page. The page has a visual indicator identifying the first user account. The content associated with the first user account is rendered when the processor receives the login with the first identity. The processor is used for receiving an interactive input in a location associated with the visual indicator. The received interaction input causes an identity selection menu to be generated on the page. When selection of a second identity other than the first identity is received, the processor is used for enabling a second set of privileges associated with the second identity. The second set of privileges is different than the first set of privileges. The processor is used for rendering content associated with a second user account. The content associated with the second user account is different than the content associated with the first user account. These or other implementations may include one or more of the following features. For example, in some implementations, the selection menu includes a name of the first user account and a name of the second user account. As another example, in various implementations, the first set of privileges includes access to a plurality of functions. The plurality of functions including maintaining associations with one or more user accounts.

In some implementations, a system is described. The system includes a plurality of servers coupled via a network. The system further includes a processor coupled with the plurality of servers via the network. The processor is used for receiving login with a first identity. The first identity is associated with a first set of privileges. The processor is used for rendering content associated with a first user account. The content associated with the first user account is rendered on a page. The page has a visual indicator identifying the first user account. The content associated with the first user account is rendered when the processor receives the login with the first identity. The processor is used for receiving an interactive input in a location associated with the visual indicator. The received interaction input causes an identity selection menu to be generated on the page. When selection of a second identity other than the first identity is received, the processor is used for enabling a second set of privileges associated with the second identity. The second set of privileges is different than the first set of privileges. The processor is used for rendering content associated with a second user account. The content associated with the second user account is different than the content associated with the first user account.

These or other implementations may include one or more of the following features. For example, in some implementations, the selection menu includes a name of the first user account and a name of the second user account. As another example, in a number of implementations, the first set of privileges includes access to a plurality of functions. The plurality of functions includes maintaining associations with one or more user accounts.

These implementations may provide one or more of the following advantages. For example, a user does not need to provide a user name and a password to log into the second user account to access the second user account. Rather, in some implementations, the user is logged into the first user account and accesses the second user account with access to a selection menu within the first user account. The user can access the second user account via the selection menu. As another example, a viewer, e.g., a user, etc., can easily identify whether the user is logged into a person account or an entity account. In several implementations, the visual indicator indicates to a viewer whether a user is logged into a person account or an entity account.

Other aspects will become apparent from the following detailed description, taken in conjunction with the accompanying drawings.

BRIEF DESCRIPTION OF THE DRAWINGS

The disclosure may best be understood by reference to the following description taken in conjunction with the accompanying drawings.

FIG. 4 shows a profile page of an entity in the social network, according to a number of implementations of the present disclosure.

DETAILED DESCRIPTION

The following some implementations describe methods, systems, and computer programs for providing visual indicators for account access in a social network. It will be apparent, that the some implementations may be practiced without some or all of these specific details.

Figure 1:
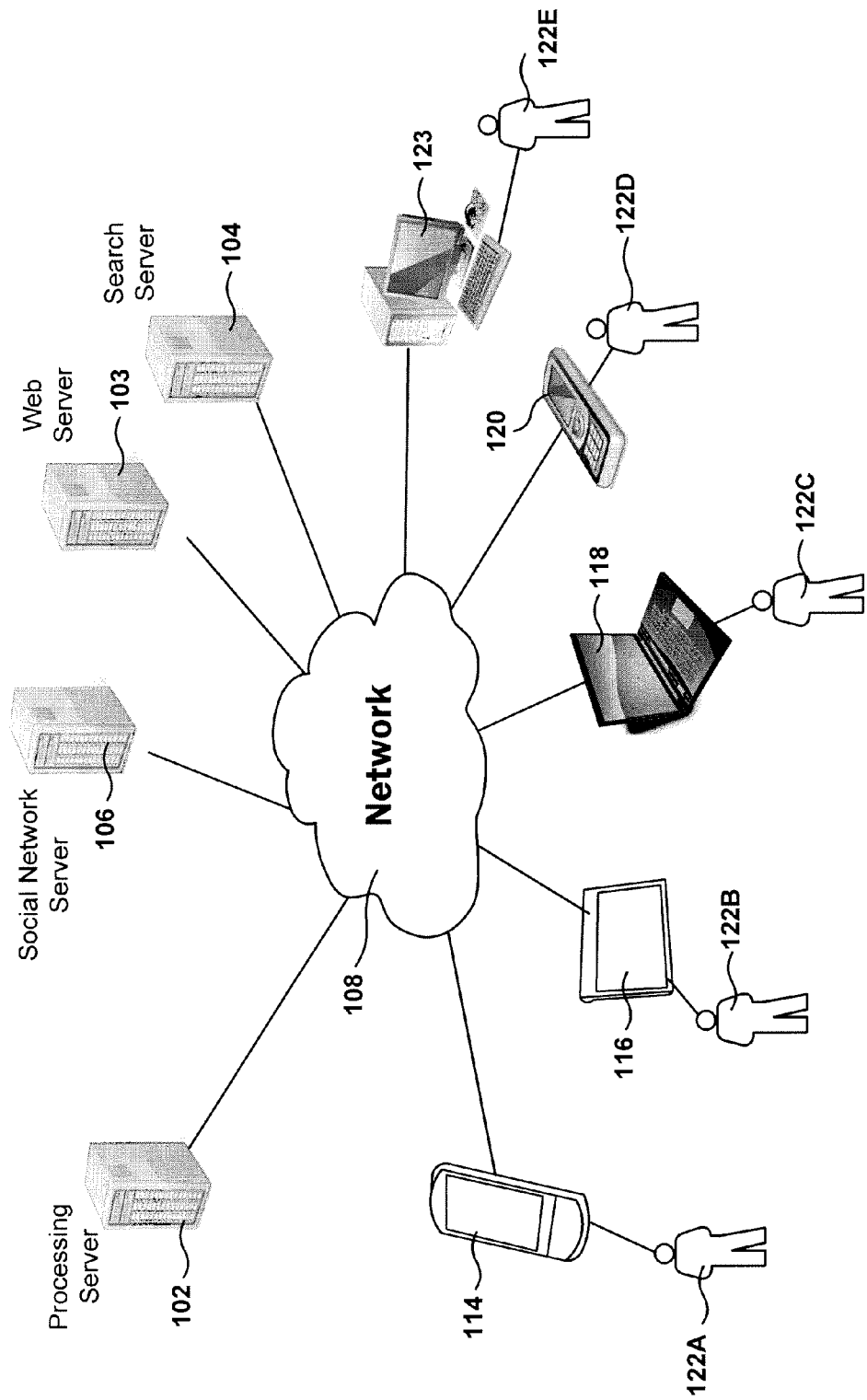
FIG. 1 illustrates the architecture of a system for implementing various implementations described in the present disclosure.

FIG. 1 provides one example architecture of a system that may utilize some implementations described herein. Users 122 interact with each other in the context of a social network, where users include real people and entities. In a number of some implementations, entities perform interactive actions similar to people, although an entity may not be an individual person. For instance, an entity may be a commercial enterprise that may wish to market goods or services. In some implementations, a person may be an entity as well when the person is acting as a public figure, e.g., a popular artist, a political figure, a world leader, etc. Each user has an account in the social network, and the account includes at least a user name. In addition, each account includes a profile of the user with additional information about the user, e.g., birth date, gender, residence, favorite activities, etc. The user is in control of what information is added to the profile, and what information is shared with others. A user may access the social network through different client devices, e.g., a smart phone 114, a tablet computer 116, a laptop 118, a mobile phone 120, a personal computer 123, any computing device, etc., that provides access to the Internet. In a number of implementations, one or more components of a client device are included in a server. In various implementations, a server is a physical server or a virtual machine (VM). Of course, the illustrated devices are only examples.

In some implementations, a web server 103 sends web page data in response to a web page request received from a client device. In various implementations, social network server 106 delivers services that enable users to interface with each other. It should be noted that in some implementations, a social network and a social network server are used interchangeably. The social network provides a site that enables users to define user accounts, which can be accounts for people and entity accounts. Through those accounts, users are able to connect with their friends, group of friends, entities, groups of entities, etc. In a number of implementations, the relationships established in the social network may be utilized in other contexts. Processing server 102 manages electronic messaging between persons and non-person entities, by enforcing rules that enable or disable electronic messaging and/or actions within the social network. Search server 104 provides Internet search capabilities.

In some implementations, the social network provides customizable controls that people may use to manage interactions and electronic messaging with non-person entities. In one example, the logic executing the social network may define various services and controls. One example service is designed for real person users (e.g., personal accounts). Another example service is designed for non-person entities (e.g., entity accounts). The entity account of the entity, on the other hand, is similar to a user account of a person, however the services and controls are different. As noted above, an entity may be a business, a famous person or figure, a commercial figure, an artist, a celebrity, a government group, a brand, a political figure, a community association, a non-profit organization, an entity that provides services, an entity that provides goods, an entity that provides goods and services, etc. Furthermore, the entity may provide its goods or services primarily on the Internet, primarily as a brick and mortar outfit, or a combination thereof. For description purposes, a real person may be referred to herein as a person, people, or an individual.

For description purposes, a non-person entity may be referred to herein as simply an entity, a company, a partnership, a corporation, a business, an entity account, etc. An entity may be a user, although its use will be through an entity account. A user, as referred to herein, is a generic term for a person or entity, unless otherwise noted. A non-entity user, therefore, may utilize the social network through a personal account.

In various implementations, the social network provides entities with a specific type of interface for posting electronic messages, communicating, sharing, and generally interacting within the social network. In a number of implementations, this interface for entities is referred to as "entity pages," indicated by a token, e.g., a mathematical symbol, etc., followed by the name of the entity in the social network. Real-persons have "person pages," which are different from entity pages and have different functionality, although some features are common to both entity pages and person pages. Any symbol, identifier, word, or character may be used to define or identify the social services. For example, a mathematical symbol is used to denote a type of site or place within the social network. In several implementations, the services can be provided without the use of any special symbols or denoted nomenclature. Thus, so long as the social network site provides the functionality defined herein, the nomenclature utilized to denote the services can take on any form, format or identifier.

In a number of implementations, a real person may act as an entity. For example, the real person may be a public figure which uses the social network to promote commercial or social activities associated with this persona. In this case, the person is treated by the social network as an entity because the main purpose of the public figure is to promote commercial or social activities. This person may, for example, have a user account as well as an entity account. The user, when acting for the entity, will login to her entity account. The user can therefore act in various roles, consistent with their login parameters or assigned privileges. In several implementations, a user can have multiple privileges, which will allow the user to log into her one account, and based on her privileges, will be allowed to access both accounts. Alternatively, each account will have its own login.

In some implementations, a person is always in control of her relationships with entities (e.g., entity pages). In a number of implementations, interactions between person and entity require person approval (e.g., an addition of the entity page to the person's social network, or a mention by the person of the entity, which are discussed in more detail below). Otherwise, entity pages present a similar behavior as person pages, once the person has initiated engagement with the entity.

Other implementations may utilize different servers, have the functionality of one server distributed over a plurality of servers, have the functionality of two or more servers combined into a single server, have a different amount of user categories in the social network, categorize users by different criteria, etc. The implementations illustrated in FIG. 1 should therefore not be interpreted to be exclusive or limiting.

Figure 2:
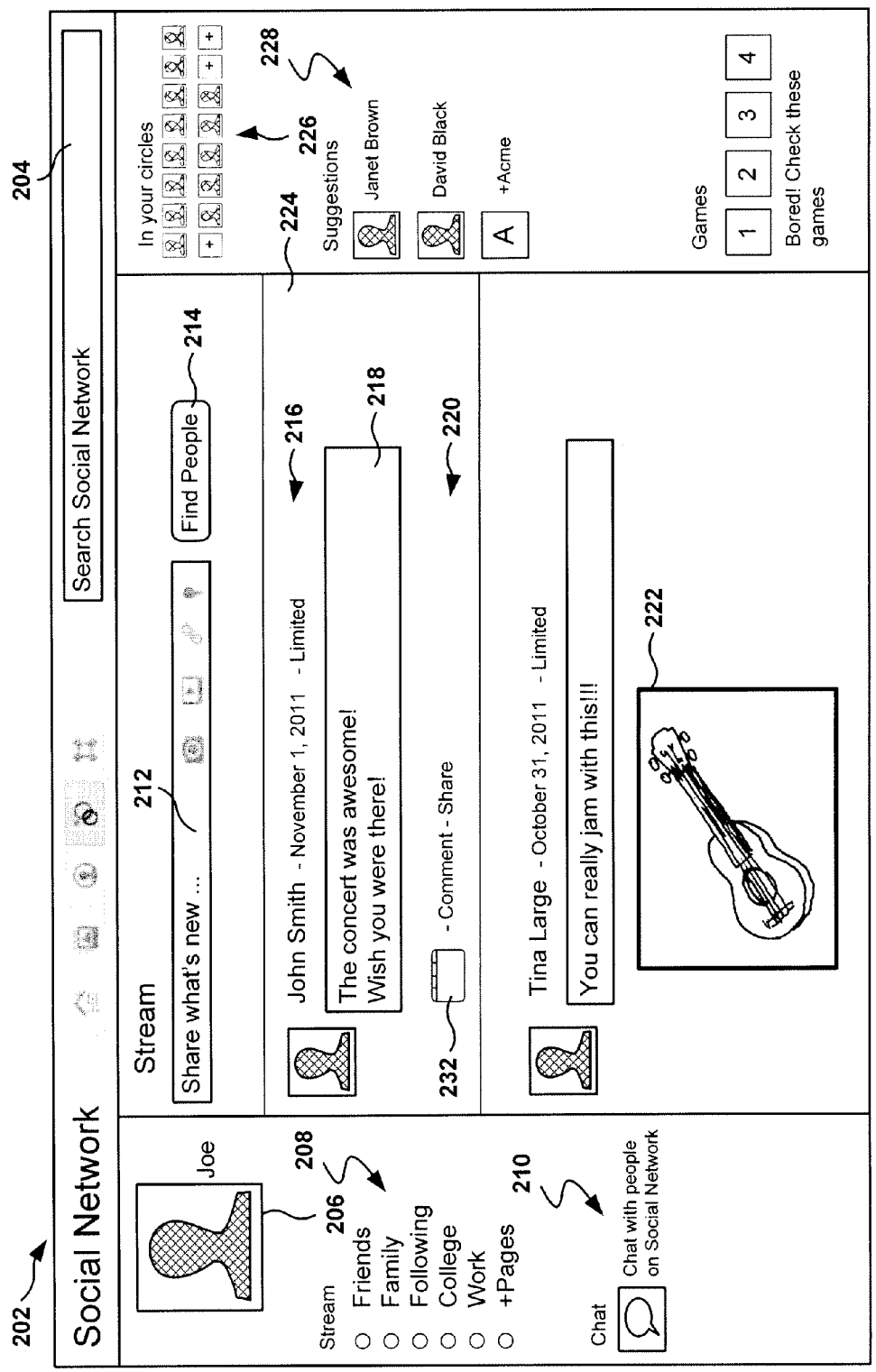
FIG. 2 is a person's web page for interfacing with a social network, according to some implementations of the present disclosure.

FIG. 2 is a person's web page 202 for interfacing with a social network, according to some implementations. For example, the person is shown logged into her user account. In a number of implementations, posts received by a user are referred to as content of a stream in the social network. Page 202 is an example snapshot of a page for viewing a person's stream in the social network, and search field 204 is an input area for searching the social network or other content.

In various implementations, the stream is presented in a middle panel of page 202. Input box 212 enables the person to add new posts in the social network. When the person enters a new post, the person is able to select the destination for the post. The destination could be to the complete social network (e.g., a public post), to a person, or to one or more groups defined by the person.

In some implementations, the groups defined by the person are referred to as "circles," but other configurations for defining groups are also possible. Examples include various graphically designed interfaces or text based lists, dialog boxes, pull downs, radio buttons, and other interfaces defined from combinations of graphical elements, text, images, pictures, combinations thereof, etc. More details regarding the creation of circles are provided below with reference to FIG. 3. In several implementations, the post may be a text message, a photo, a video, a link to a webpage, or a location of the person. Thus, the content and form of the post should be broadly construed to include any data that can be presented, displayed, listened to, interfaced with, received, sent, shared, approved, or disapproved, etc.

In a number of implementations, the stream includes posts added by the person, by others socially linked to the person, or by an entity that the person has chosen to follow (e.g., be linked with/to in the social network). In some implementations, an entity may be restricted from posting to a person's stream, unless the person has established a social link with the entity beforehand, e.g., the person has chosen to follow the entity.

In several implementations, each post 224 may include information 216 about the author, the timestamp of the post, and the scope of the post (e.g., public, limited, etc.). Example post 224 may include a text message entered by person named "John Smith," but other types of posts are possible, e.g., the photo 222, a video, a link, data, etc. In a number of implementations, a name of a person is a name of a user account of the social network. The social network provides options 220 to respond to the post, e.g., providing an endorsement of the post, adding a comment to the post, sharing the post with others, etc.

As used herein, an endorsement is a public recommendation of an item, e.g., a webpage, a person, a post, an entity, etc. An endorsement may also be referred to or provided as an acknowledgment, a thumbs-up, a ✓ (check) mark, a confirmation, a ratification, a validation, a seal of approval, a testimonial, support, advocacy, an approval, a ratification, etc. In some implementations, a button is provided in various web pages to enable the person to provide his or her endorsement. See for example button 232. The various web pages can be pages on accounts of the social network, on pages of third party web sites, on search pages, in lists of search results, etc. The button 232 is provided, in a number of implementations, as an icon that can be selected by the user. When selected, the count associated with the button 232 is displayed, so as to provide the user with information regarding the number of other users that may have selected the button 232.

Therefore, an endorsement button is not limited to use in the social network, and the endorsement button may appear in a variety of places and sites across the Internet. For example, an endorsement button may be next to an Internet search result, an Internet ad, a news article, a product, etc. When the person presses the endorsement button, a count associated with the item endorsed is incremented. The count measures the popularity of the item, and as people endorse an item, the counter associated with the item increases. In various implementations, the action of endorsing an entity in the social network does not cause the entity to be linked with the person in the social network. In some implementations, for a link to be established in the social network between the person and the entity, a different operation is required where the person explicitly adds the entity to the person's social network. The explicit add can by performed by user selection on an interface, addition of an entity to one of their groups, e.g., circle, etc., or selection of a button, icon, or some input control to follow the entity. The following can also be triggered automatically, based on the user's approval to take this action each time the user views, finds, selects, or interfaces with an account of an entity.

In several implementations, a "mention" is an explicit reference to a user in an electronic message. A mention allows the creator of the post to grab someone's attention to a post because of the introduction of a mention identifier with, for example, someone's name. In some implementations, a mention is performed by utilizing a sign, e.g., a mathematical symbol, etc., followed by the name of a person or entity. It is noted that a sign may be used to mention a person or an entity. When a person or an entity is mentioned within the context of the social network, the person or entity may receive a notification that they have been mentioned in a post (depending on notification settings). The user is also able to see the entirety of the post on which the user is mentioned, even if the post wasn't originally shared with the user.

Button 214 gives the person the ability to enter a different webpage, which provides an interface to identify search parameters for finding people or entities in the social network. A profile picture 206 of the person may be provided on the left side of page 202. In addition, stream filtering options 208 allows the person to limit or tune what is presented on the stream. In various implementations, the filtering options included radio buttons to select or deselect the groups created by the person. In addition, the filtering options also include a radio button to enable or disable messages from entity pages in the stream. Although radio buttons are used, other types of user selectable controls may be used, e.g., drop downs, text fields, toggles, voice inputs, etc. In some implementations, a chat button 210 is provided to allow the person to engage in conversation with others in the social network. On the right panel, icons 226 represent users in the social network that are linked with the person. In addition, the social network provides suggested new users in area 228. It is again noted that the layout of the features on the page 202 is only one example, and the layout can vary based on site designer preferences.

Implementations of the present disclosure allow people to be in control of social messages. For an entity to initiate electronic messaging with the person, the person has to first add explicitly the entity to its social network. In some implementations, an entity is not able to initiate electronic messaging in the social network with a person that has not added the entity to its social network, or that has explicitly mentioned the entity in a post.

The person is able to perform certain operations affecting the relationship between the person and the entity. The person may endorse the entity, or the person may add the entity to one of her social groups defined in the social network. In some implementations, the fact that the person endorses an entity does not enable the entity to freely initiate full electronic messaging, e.g., posting, etc., with the person. Of course, when the person and the entity are socially linked, the entity may initiate electronic messaging with the person and post on the person's user account.

Figure 3:
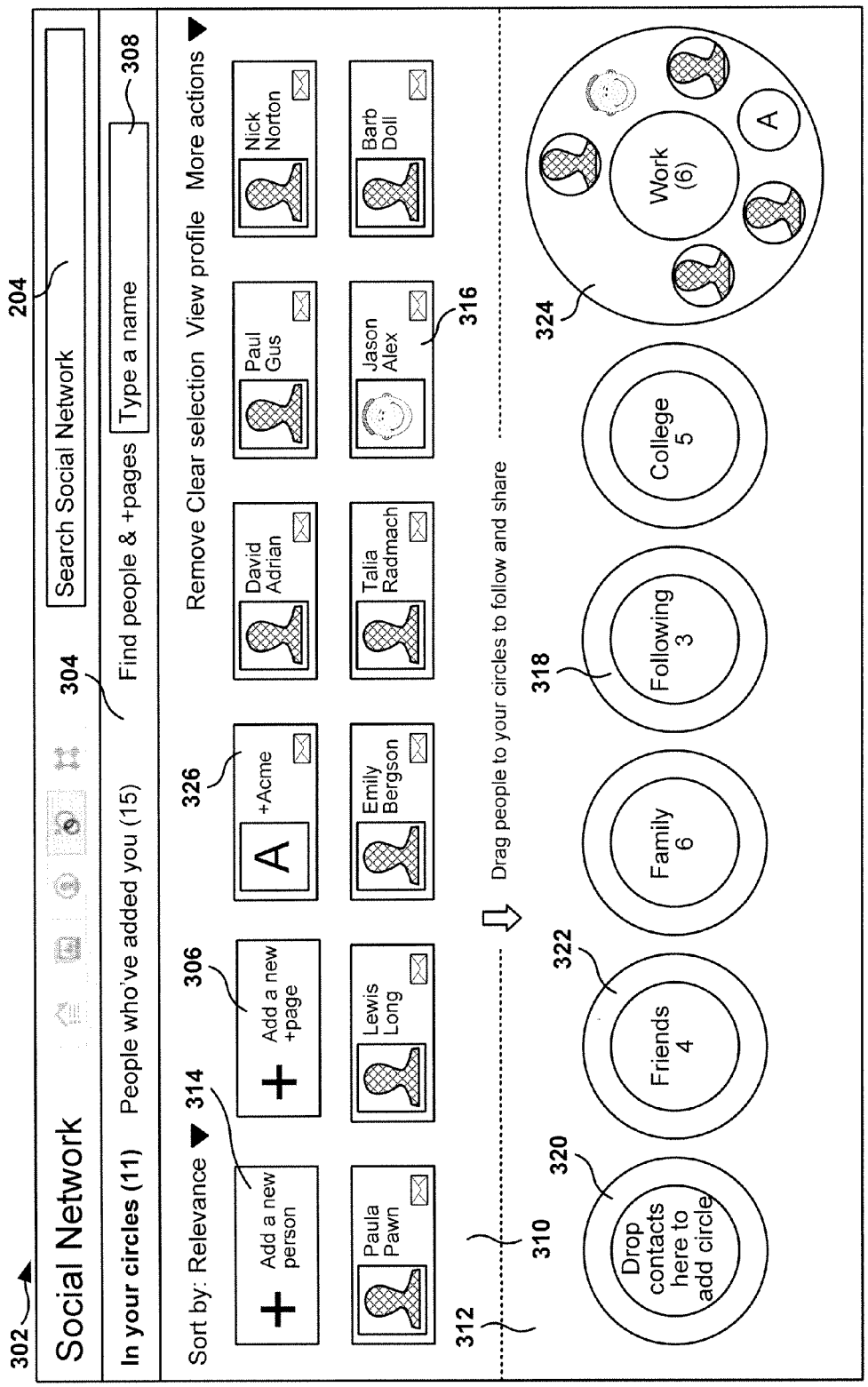
FIG. 3 is a web page for managing user groups within the social network, according to various implementations of the present disclosure.

FIG. 3 is a web page 302 for managing user groups within the social network, according to several implementations. Bar 304 provides selections options for choosing users, which are then displayed in users area 310. In the implementations illustrated in FIG. 3, the person has selected the option "In your circles" to display users that are currently in the person's circles (e.g., user defined groups). A second option in bar 304 allows the selection of persons that have added the owner of the page to their groups in the social network. In addition, bar 304 includes an input field 308 to search for people or entities. In some implementations, the social network provides an option to follow other users anonymously. If a person follows another user anonymously, the person will be able to see the public posts of the user, and the person or entity being followed would not be aware that this person is following them.

User's area 310 displays icons, images, pictures or indicators associated with several users, and circles area 312 includes the groups defined by the user. In several implementations, the person is able to add users to the circles in circles area 312 by selecting a user icon, dragging the icon to the circles area 312, and dropping the icon in one of the circles. In a number of implementations, an icon, displayed within the user's area 310, associated with a person is different than an icon, displayed within the user's area 310, associated with an entity. For example, the icon associated with a person lacks a symbol, e.g., a mathematical symbol, etc., and the icon associated with an entity includes the symbol. The display of the sign within an icon indicates to a user that a selection of the symbol will facilitate generation of information related to an entity. Moreover, the display of the lack of the sign within an icon indicates to a user that a selection of the icon will facilitate generation of information related to a person.

In various implementations, an icon is associated with a person when a selection of the icon by a user enables the user to access information about the person or enables the user to search for information about the person. In some implementations, an icon is associated with an entity when a selection of the icon by a user enables the user to access information about the entity or enables the user to search for information about the entity.

Figure 4:
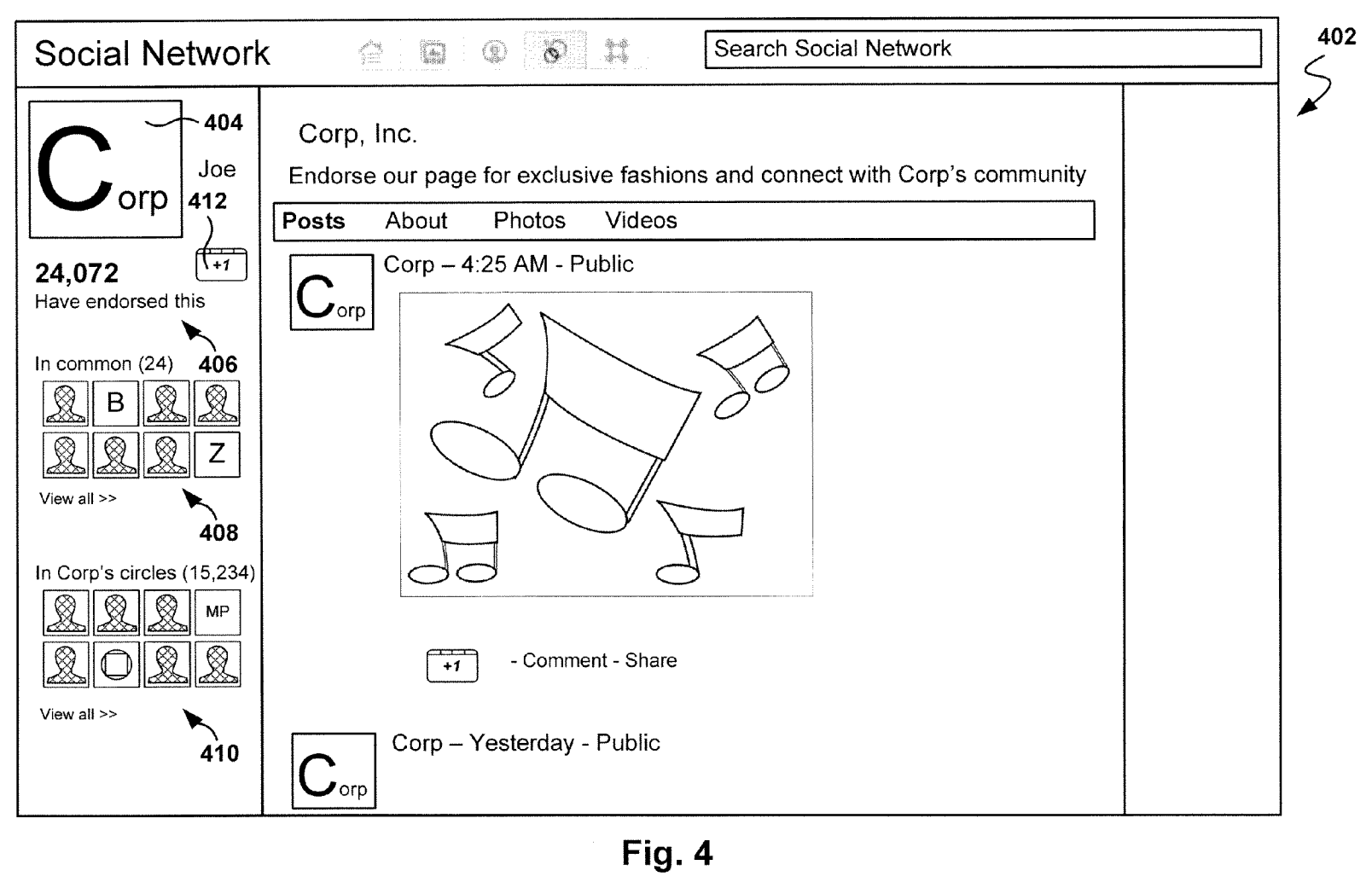

In various implementations, the sign is displayed on a profile page, e.g., a profile page 402, etc., which is illustrated in FIG. 4. In such implementations, the profile page is associated with an entity. Moreover, in some implementations, a profile page that lacks display of the sign indicates to a user that the profile page is associated with a person.

In a number of implementations, instead of multiple icons within the user's area 310, a user's area includes multiple tabs, which include hyperlinks to other web pages. For example, one tab is associated with a person and another tab is associated with an entity. When a user selects the tab associated with the person, the user is able to access information about the person or is able to search for further information regarding the person. Similarly, when a user selects the tab associated with the entity, the user is able to access information about the entity or is able to search for further information regarding the entity.

In several implementations, in a social network, the sign is displayed on a web page associated with an entity. For example, when a user selects an icon having a sign or a tab having the sign, a processing device directs the user to a web page that includes the sign. In various implementations, a web page is associated with an entity when the entity logs into a social networking web site that has the web page.

In some implementations, in a social network, there is a lack of display of a sign on a web page associated with a person. For example, when a user selects an icon lacking a sign or a tab lacking the sign, a processing device directs the user to a web page that lacks the sign. In some implementations, a web page is associated with a person when the person logs into a social networking web site that has the web page.

To delete a user from a circle, the user icon inside the circle is dragged from the circle and dropped outside the circle. In a number of implementations, when the person moves the mouse over a circle, the circle is enlarged to show the user icons corresponding to the users belonging to that circle. For example, after placing the mouse over circle 324, circle 324 is expanded, having now a larger size than the other circles, and presents the users currently in that circle. Other circles, e.g., circle 322 named "Friends," etc., are presented in a smaller size than circle 324 and do not show their contents. To create a new circle, the person can drop a user from user's area 310 in circle 320.

In several implementations, the social network creates a default circle for inclusion of entity pages. The implementations illustrated using FIG. 3 provide a circle 318 named "Following" for inclusion of entity pages. The entity pages do not have to be added to circle 318, and may be added to any of the circles defined by the person. In some implementations, persons and entities can also be added to more than one circle. In a number of implementations, when a person starts following an entity, the entity is automatically added to the "Following" circle, although the person may later remove the entity or moving to another circle. In various implementations, when the decision is made to follow an entity, a drop down provides the user with options to add the entity to any one of the circles previously created by the user or to a following circle. This option allows for direct adding of users to circles, without first adding them to the following circle 318.

The users in user area 310 can be real persons (e.g., person 316 "Jason Alex") or can be entities (e.g., entity 326). People are able to place real persons or entities in any of the circles below, and a circle may have just people, just entities, or a mix of people and entities.

In various implementations, user area 310 also includes a couple of selection boxes, e.g., a box 314, etc., for adding personal accounts and a box 316 for adding entity accounts. When the person selects one of these boxes, options are presented to enter the name of a person or an entity, or to perform a search on the social network. In a number of implementations, a unique box is presented to search for people or entities. In several implementations, once the person enters a sign, e.g., a mathematical symbol, etc., as the first character of the search, the social network limits the search to entities. Otherwise, the search is limited to real persons. Again, it should be understood that any other symbol or token can be used to filter, identify or modify a search query.

It should be noted that in some implementations, a person and a personal account are used interchangeably and an entity and an entity account are used interchangeably.

FIG. 4 shows the profile page 402 of an entity in the social network, according to several implementations. When a user clicks on the name of another user, the associated profile page for the user is presented. FIG. 4 shows the profile page of an entity. In the middle panel, posts from the entity that are visible to this user are presented, with a similar format to the posts shown in the stream of FIG. 3.

The profile page 402 includes a region that can accept an icon 404 associated with the entity and the name of the entity next to the icon 404. In addition, an endorsement button 412 gives the person or other entity an option for endorsing the entity associated with the profile page. Counter 406 provides information about the number of people or entities that have endorsed this entity. In several implementations, the profile page of a person may not include endorsement button 412. In a number of implementations, the social network allows for the endorsement of real people, and an endorsement button is available to endorse people.

Profile page 402 also includes information about users 408 in the user's circles that are also following this entity, e.g., users "in common" following this entity, etc. This information helps the entity improve its corporate image by showing related users that also are associated with the entity. In addition, information 410 is provided about users or entities of the social network that are in the entity's circles but that are not currently in any of the user's circles.

In some implementations, the social network enforces a privacy mechanic, e.g., a policy, etc., to protect people from undesired messages. In several implementations, the policy defines two types of users: people and entities. The electronic messaging rules in the social network are different for people and for entities. A person may initiate contact with an entity, but the entity may not initiate contact with the person. Once the person establishes a social link with the entity (e.g., the person adds the entity to one or more circles), then the entity may start communicating with the person via electronic messages. In a number of implementations, an entity may initiate contact with other entities (of course, subject to user privacy settings), but not with real people (e.g., user accounts). This policy puts the person in command of the electronic messaging flow between people and entities.

In some implementations, the privacy policy defines that people may not have automatic acceptance of tags for photos posted on the social network by entities. However, there can be automatic acceptance of tags from entities by other entities.

Figure 5:
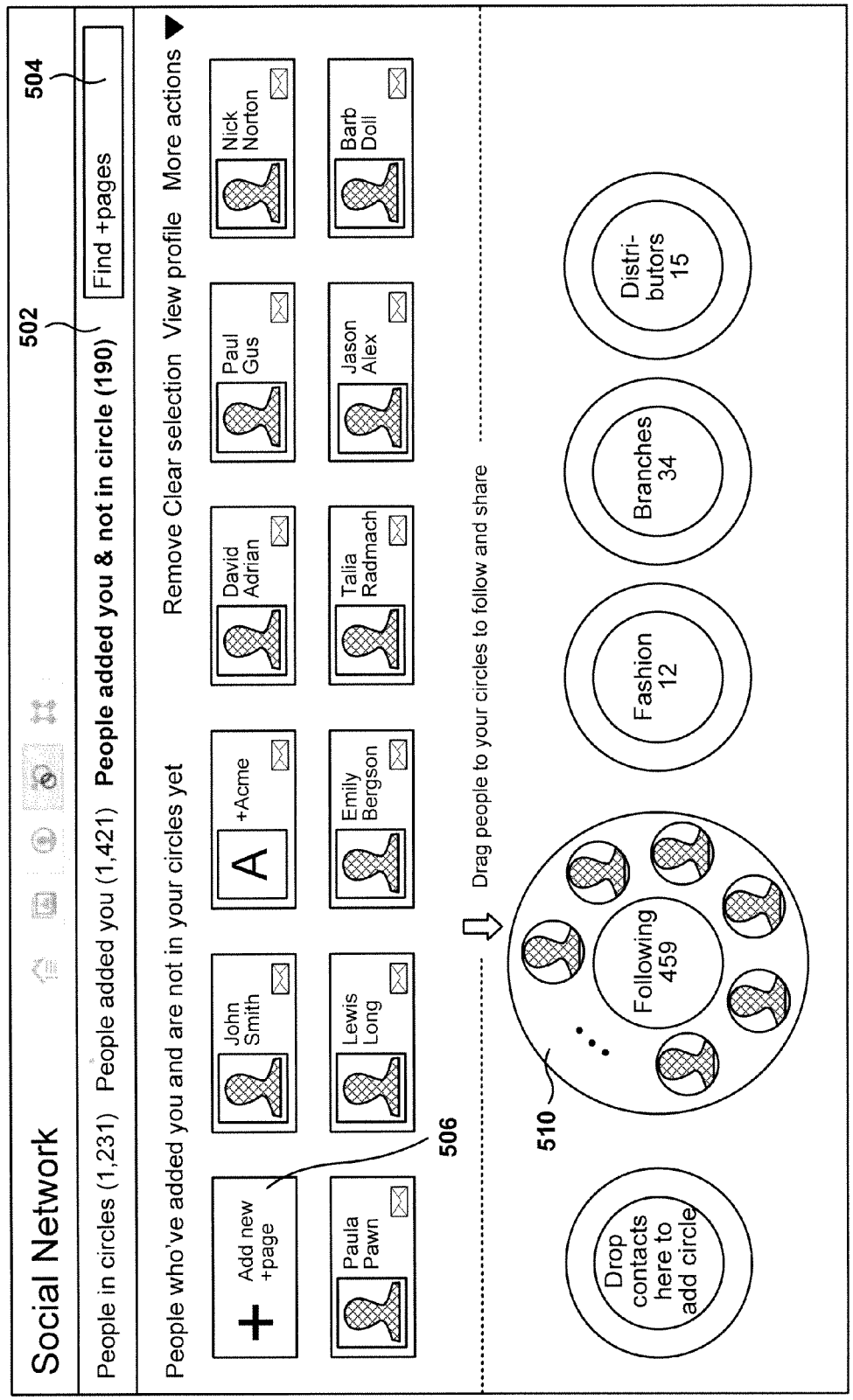
FIG. 5 is a web page for the management of user groups by an entity, according to some implementations of the present disclosure.

FIG. 5 is a web page for the management of user groups by an entity, according to a number of implementations. Bar 502 for selecting users includes options for showing people already in the entity's circles, showing people that are following the entity, and showing people that are following the entity and not yet in a circle. The search box 504 is different from the search box 308 of FIG. 3 because an entity cannot search for people, or be allowed to find people to first approach. An entity may only search for other entities (e.g., entity pages). Additionally, because the entity may not search for people, the circle editor for entities does not include the icon 314 of FIG. 3 to add new persons. Entities are only provided with icon 506 to add other entities. Although the functions of this mechanic are described with reference to icons that are present or not present, other icons, text, windows, selection features may be used.

In multiple implementations, the social network provides a default circle 510 to the entity for adding users followed by the entity. Circle 510, named "Following" in the sample of FIG. 5, is intended to be used for adding users that are being followed by the entity, in response to the person's initiated following of the entity. However, the entity may add other circles and organize the users followed as desired by the administrator of the entity page. For example, the implementations describe using FIG. 5 illustrate a page that includes, besides the Following circle 510, a Fashion circle (e.g., to include other related companies in the fashion industry), a branches circle (e.g., to include retail outlets for the entity), and a Distributors circle (e.g., to include the distributors that carry the entity's products).

The entity may add each user to more than one circle. For example, the entity might create circles by geographic location in order to better target marketing messages (e.g., United States, South America, Europe, Asia, etc.), or may create circles according to demographic criteria (e.g., 5-15 years old, 16-25, 25-50, and 51+). The number and type of circles (e.g., groups) created by the entity are limitless. The circles can be created for limited times, and people can be dynamically moved by the entity or a process set by the entity.

In some implementations, the social network provides an automatic creation of circles, based on the parameters selected by the entity and executed by the process, or based on user characteristics. In several implementations, this feature is referred to as suggested circles. Each suggested circle is associated with a respective one or more attributes, e.g., geographic location, age range, gender, language, country, etc. When a person first starts following an entity, the person is automatically added to the entity's suggested circles that match the person's characteristics. For example, a person is added to a circle for the city of San Jose if the person lives in San Jose, the person is added to a circle for ages from 10 to 20 if the person is 19 years old, the person is added to a circle for United States if the person lives in the United States, etc.

It is noted that each person is added to suggested circles when the person has provided the corresponding information to the social network (e.g., provided the information to the user profile) and the person has allowed the social network to use this or part of the information for selection of people to be added to the corresponding circles. In a number of implementations, the content of the suggested circles is not available for inspection by the entity. This way, the entity does not receive information about the person, although the entity can target its marketing messages to the appropriate segments due to the infrastructure provided by the suggested circles.

The mechanic of suggested circles, in some implementations, is transparent to people, and settable by administrative functions of the entity. For example a person might receive a message from a company, but the person does not know why she received the message. The reason the person received the particular message may be, for example, because the entity decided to send that message to all of the people or entities that were part of one of their circles. As another example, the entity may decide to move certain people and entities into a circle for an upcoming event. Before the event, the entity can set a campaign to notify those people and entities regarding information, specials, coupons, etc., as it pertains to the upcoming event. Once the event is done, the entity can manually move the people and entities back to their originally established default circles. In a variety of implementations, the users that were added to the event circle can simply be copied (as a second instance) to the event circle. When the event is done, the event circle is deleted. The users, however, are still present in their previously defined circles of the entity.

In some implementations, the suggested circles are administered by the entity because the social network provides information about the person to the entity (of course, the person's information (or only certain specific information) provided must be approved by the person). In several implementations, the entity is able to manually assign people to suggested circles according to their characteristics in order to customize marketing electronic messages.

Figure 6:
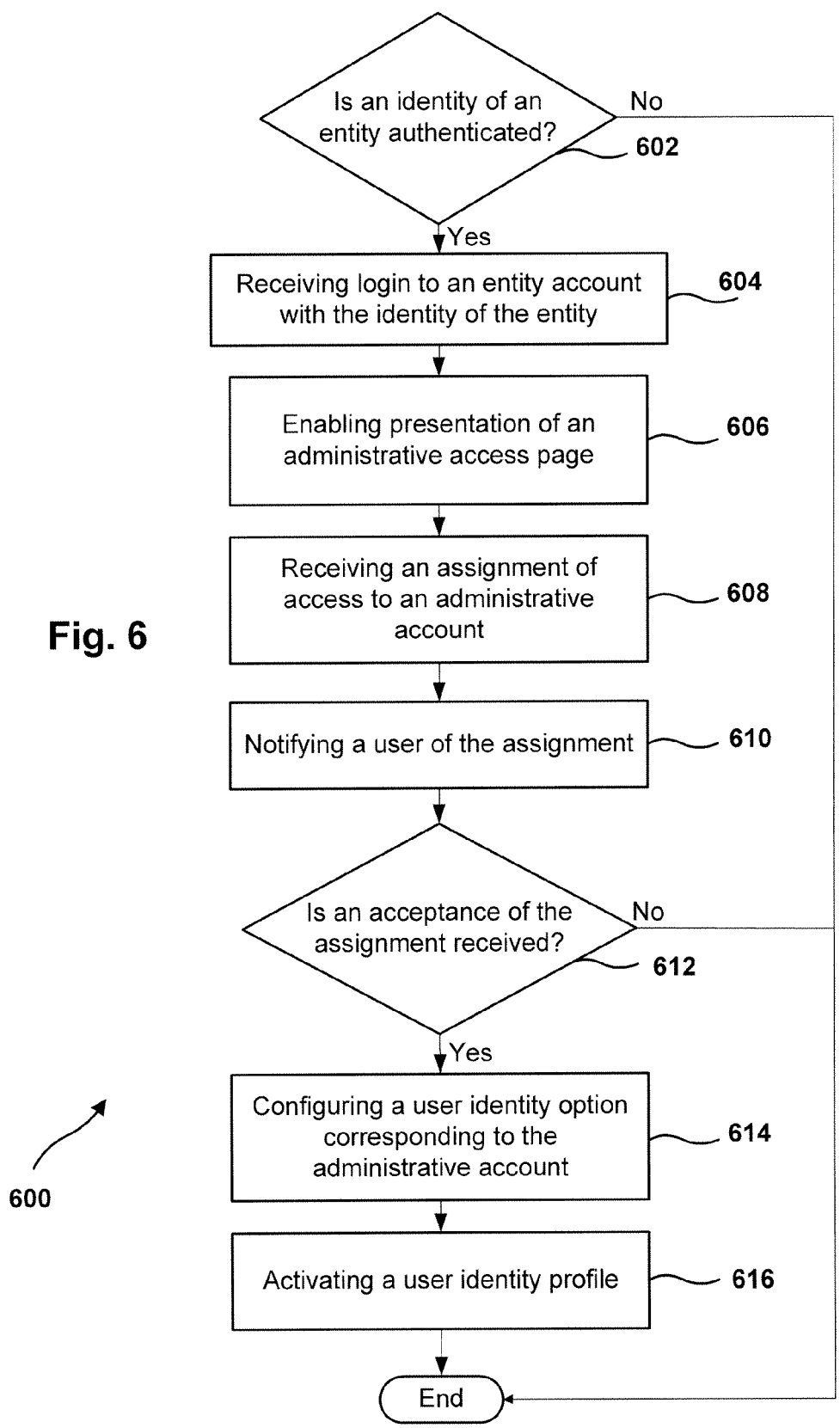
FIG. 6 is a flowchart of a method for associating a user identity profile with a social network, according to various implementations of the present disclosure.

FIG. 6 is a flowchart of some implementations of a method 600 for associating a user identity profile with a social network. The method 600 is executed by a processor of a server, a processor of a client device, or a combination thereof. It should be noted that in several implementations, a processor of a server, a processor of a client device, or a combination thereof is referred to herein as a processing device. In operation 602, it is determined whether an identity of an entity is authenticated. In a number of implementations, the identity of an entity includes an electronic messaging address assigned to an entity and/or an entity password assigned to the entity. The identity of the entity allows an entity to access an entity access account. In some implementations, an entity access account is stored on web server 103 or within a client device. In some implementations, an entity access account is other than an account on a social network but is coupled with the social network. In several implementations, an entity access account is managed by an entity with a client device, a server, or a combination thereof. In a number of implementations, a person authorized by an entity manages an entity access account. In various implementations, an administrator of an entity lacks authorization to access an entity access account. In several implementations, top-level managers, e.g., president, vice-president, chief executive officer, a member of board of directors, etc., of an entity have authorization to access an entity access account. In various implementations, an administrator is a person responsible to carrying day to day tasks of an entity to run a business of the entity. In some implementations, an administrator is the same as or other than a top-level manager.

In a number of implementations, an identity of an entity is authenticated when a processing device determines that there is match between an entity's electronic messaging address received from an entity via a client device and an entity's electronic messaging address stored in a server. In several implementations, an identity of an entity is authenticated when a processing device determines that there is match between an entity password received from an entity via a client device and an entity password stored in a server. In some implementations, an identity of an entity is authenticated when a processing device determines that there is a match between the received electronic messaging address of the entity and the stored electronic messaging address of the entity and that there is a match between the received entity password and the stored entity password. In various implementations, instead of using an electronic messaging address, an entity uses a name of the entity to access the entity access account.

Upon determining that an identity of an entity is not authenticated, the method 600 ends. On the other hand, upon determining that an identity of an entity is authenticated, in operation 604, a login to an entity access account is received. The login to an entity access account is performed by an entity with an identity.

In response to determining that a login with an identity of an entity is received, in operation 606, a presentation of an administrative access page is enabled. In some implementations, an administrative access page is a web page requested from the web server 103. In various implementations, a presentation of an administrative access page is enabled when administrative access page data is sent by a server to a client device. A processor of the client device processes the administrative access page data to render an administrative access page on a display device. In several implementations, a presentation includes multimedia, e.g., text, an animation, a video, an image, etc.

In operation 608, an assignment of access to an administrative account on a social network is received. In some implementations, the administrative account enables a user to act in a role of an administrator of an entity. In several implementations, with an administrative account, an administrative of an entity furthers business goals of the entity. In a number of implementations, an administrative account is different from a personal account in that the administrative account is primarily used to further the business goals and the personal account is primarily used to further personal goals of a person.

In some implementations, an entity selects an identity of an administrative account and a confirmation button to provide an assignment of access. In some implementations, the identity of an administrative account and the confirmation button are presented on the administrative access page. In several implementations, a confirmation button is a mouse button or a keyboard button.

An identity of an administrative account includes an electronic messaging address of an administrator and/or a password assigned to the administrator. When an administrator uses an input device to provide an electronic messaging address of the administrative account and/or a password of the administrative account to social network server 106 and the electronic messaging address and/or password are authenticated by the server 106, an administrator accesses the administrative account.

In operation 610, a user is notified of the assignment. In some implementations, the notification is sent to an electronic messaging address of a user or is sent via an instant message to an instant message account of a user. In various implementations, the electronic messaging address of an administrator and/or a password assigned to the administrator is sent with the notification to a user account. In a number of implementations, the notification is sent to a user account on a social network to notify a user. In some implementations, a user account is an account of a user on a social network. A user logs into a user account by providing an electronic messaging address and/or a user password to a social network. In several implementations, when a user is notified of the assignment, the user is authorized, by an entity, to access the administrative account.

Moreover, in operation 612, it is determined whether an acceptance of the assignment is received from a user. In some implementations, a user sends the acceptance by responding to an electronic message or an instant message. In several implementations, a user selects, via an input device, an 'Accept' button that is presented on the page 202 or 302. In various implementations, the acceptance is sent by a client device to a server via the network 108, e.g., the Internet, an Intranet, etc. In several implementations, the acceptance is presented by a processing device on the administrative access page.

In response to determining that there is a lack of reception of the acceptance, the method 600 ends. On the other hand, upon determining that the acceptance is received, in operation 614, a user identity option corresponding to the administrative account for which the acceptance is received is configured. In some implementations, operation 614 is performed by an entity. In several implementations, the operation 614 is performed by an administrator.

In some implementations, an entity or an administrator uses an input device of a client device to create or download graphical elements, e.g., multimedia data, etc., from a server, and link the graphical elements to the administrative account for which the acceptance is received to configure a user identity option. In such implementations, the entity or an administrator uses a client device to upload one or more parts of the graphical elements to the social network server 106. In such implementations, a client device retrieves the graphical elements from the social network server 106 and processes the graphical elements to render the user identity option. Moreover, in several implementations, an entity or an administrator accesses the social network server 106 and uses tools available on the social network server 106 to create one or more graphical elements.

In some implementations, a user identity option includes an association of a name of an entity with a name of an administrator. For example, an association of a name of an entity with a name of an administrator includes "Bob XYZ_Admin", where 'Bob' is a person's name, Bob together with Admin is a name of an administrator, and XYZ is a name of an entity. As another example, an association of a name of an entity with a name of an administrator includes "Bob Coffee_Admin", where 'Bob' is a person's name, Bob together with Admin is a name of an administrator, and Coffee is a name of an entity, which is a coffee shop. In some implementations, a user identity option includes a symbol, e.g., a trademark, a service mark, etc., distinguishing an entity from other entities. In several implementations, a user identity option includes multimedia that identifies an administrator and an entity.

In a number of implementations, user identity option data is stored in a database of social network server 106 or in a database located outside of the social network server 106. The database located outside the social network 106 is coupled with the network 108. In several implementations, the storage of the user identity option data is performed by a processing device. In some implementations, the user identity option data is processed by a processing device to render the user identity option.

In various implementations, the operation 614 is performed by an entity that creates or controls the social network. Such an entity that controls or creates the social network obtains permissions from another entity that has rights to a symbol before using the symbol on the social network.

In operation 616, a user identity profile is activated. In some implementations, a processing device activates a user identity profile by designating the administrative account as active on a client device or on a server. In various implementations, an entity access account indicates that the administrative account is active.

In several implementations, upon receiving the configuration of a user identity option, the social network server 106 queries a client device that is controlled by an entity or by an administrator to determine whether an administrative account identified using the user identity option is to be linked with a user account. In such implementations, the entity or the administrator uses a client device to respond to the social network server 106 confirming or denying the link between a user account and an administrative account.

In some implementations, a processing device of the social network server 106 determines whether there is a link between an administrative account and a user account based on whether the entity-administrator name association includes a name of a user that has a user account on the social network. In several implementations, the name of the user is associated with the user account of the social network server 106. Upon determining that the entity-administrator name association includes the name of the user, the processing device of the social network server 106 determines that there is a link between the administrative account and the user account. On the other hand, upon determining that the entity-administrator name association excludes the name of the user, the processing device determines that the link does not exist.

Figure 7:
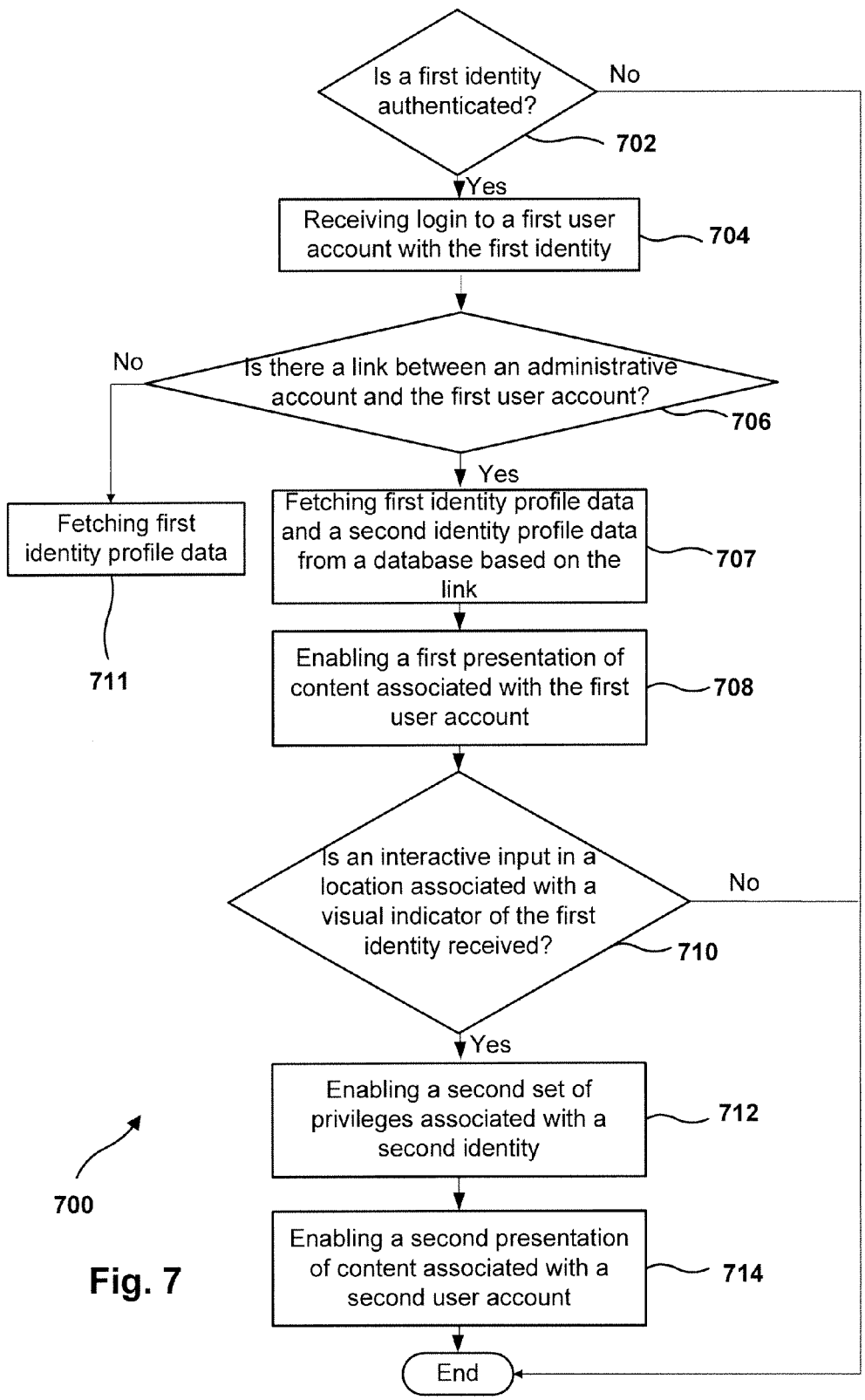
FIG. 7 is a flowchart of a method for changing presentation of content based on an identity of a user, according to a number of implementations of the present disclosure.

FIG. 7 is a flowchart of some implementations of a method 700 for changing presentation of content based on an identity of a user. The method 700 is executed by a processor of a server, a processor of a client device, or a combination thereof. In several implementations, the method 700 is performed by the social network server 106. In operation 702, it is determined whether a first identity is authenticated. The first identity identifies a user account. In various implementations, the first identity includes an electronic messaging address, e.g., email address, etc., of the user and/or a user password. The first identity allows a user to access a user account on a social network.

In multiple implementations, the first identity is authenticated when the social network server 106 determines that there is match between an electronic messaging address received from a user via a client device and an electronic messaging address stored in the social network server 106. In a number of implementations, the first identity is authenticated when the social network server 106 determines that there is match between a user password received from a user via a client device and a user password stored in the social network server 106. In some implementations, the first identity is authenticated when the social network server 106 determines that there is a match between the received user electronic messaging address and the stored electronic messaging address and that there is a match between the received user password and the stored user password.

Upon determining that the first identity is not authenticated, the method 700 ends. On the other hand, upon determining that the first identity is authenticated, in operation 704, a login to a first user account is received. The login is performed by a user with the first identity.

In response to determining that a login with the first identity is received, in operation 706, a processing device of the social network server 106 determines whether there is a link between an administrative account and the first user account. Upon determining that the link exists, in operation 707, a first identity profile data and a second identity profile data are fetched from a database. In some implementations, the database is located within social network server 106. In various implementations, the database is located outside the social network server 106 and is coupled with the network 108.

In several implementations, the first identity profile data includes profile data that identifies a person without mention of the person being an administrator and the second identity profile data includes profile data that identifies the person as an administrator. In various implementations, the first identity profile data excludes data related to a role of a person as an administrator of an entity and the second identity profile data includes data related to the role.

In some implementations, the first identity profile data is processed by a processing device to render the first identity profile and the second identity profile data is processed by a processing device to render the second identity profile. Moreover, in several implementations, the first identity profile data excludes the entity-administrator name association and the second identity profile data includes the entity-administrator name association. In various implementations, the first identity profile data excludes a symbol identifying an entity and the second identity profile data includes the symbol. In some implementations, the first identity profile includes a thumbnail of the profile picture 206, which is shown in FIG. 2. In several implementations, the second identity profile includes the user identity option. On the other hand, in response to determining that the link does not exist, in operation 711, the social network server 106 fetches the first identity profile data from a database.

In operation 708, a first presentation of content associated with the first user account is enabled by a processing device. In various implementations, a processing device of the social network server 106 enables the first presentation of content by sending web page data to a client device to render web page 202 and/or web page 302. A processor of the client device renders web page data to render the web page 202 and/or web page 302. In some implementations, a first presentation of content includes a display of circles that a user with access to the first user account is following. In several implementations, a first presentation of content includes a display of circles that a user with access to the first user account has created.

In some implementations, the first user account is associated with a first set of privileges. For example, a user who accesses to the first user account by using the first identity is provided an interface of the social network to maintain associations with other users. In a variety of implementations, such associations with other users are maintained via circles, posts received from or sent to the other users, and multimedia received from or sent to the other users.

On the other hand, upon determining that there is a lack of a link between an administrative account and the first user account, in operation 711, the first identity profile data is fetched from a database without fetching the second identity profile data.

Moreover, in operation 710, a determination is made as to whether an interactive input is received in a location associated with a visual indicator of the first identity. In some implementations, an interactive input is received when a user selects a location near a visual indicator with an input device. In various implementations, a selection is received from a user via a touch screen, a mouse, or a keyboard. In a number of implementations, a visual indicator includes a thumbnail of a profile picture. In several implementations, a visual indicator includes an association of a name of an entity with a name of an administrator. In some implementations, a visual indicator includes a symbol identifying an entity. In various implementations, a visual indicator is displayed on the web page 202 or on the web page 302. In some implementations, a visual indicator includes a name of a user who has a user account that has the first identity. In multiple implementations, an interactive input is received in a location associated with a visual indicator when no multimedia or a limited number of multimedia is displayed between the thumbnail and the location at which the interactive input is received.

In some implementations, the interactive input is received to generate a selection menu, described below. The selection menu is generated by a processing device. In multiple implementations, selection menu data is sent by a processor of the social network server 106 to a processor of a client device. The processor of the client device processors the selection menu data to render the selection menu. In various implementations, a selection menu includes a name of a user and/or an association of a name of an entity with a name of an administrator. In several implementations, a selection menu includes a symbol identifying an entity and/or an association of a name of the entity with a name of an administrator. In some implementations, a selection menu includes a name of a user and/or a profile picture of the user.

In response to determining that there is a lack of reception of the interactive input, the method 700 ends. On the other hand, upon determining that the interactive input is received, in operation 712, a second set of privileges associated with a second identity is enabled. In various implementations, a second set of privileges is enabled when privilege data of the second set is sent from the social network server 106 to a client device. In some implementations, the second identity includes an identity of the administrative account. In a number of implementations, the second identity includes an electronic messaging address and/or a password used to access an administrative account.

In several implementations, the second set of privileges includes allowing the administrator to maintain associations with other users. In some implementations, such associations with other administrators are maintained via circles, posts received from or sent to the other administrators, and multimedia received from or sent to the other administrators. In various implementations, the second set of privileges includes allowing the administrator of an entity to maintain associations with other administrators of other entities. In some implementations, the second set of privileges includes disallowing the administrator of an entity to maintain associations with users who are not administrators. In various implementations, the second set of privileges is different from the first set of privileges. For example, the second set of privileges is provided to a person in the role of an administrator and the first set of privileges is provided to the person in a personal role. It should be noted that in some implementations, an administrator and an administrative account is used interchangeably.

In operation 714, a second presentation of content associated with a second user account is enabled 714. In several implementations, the second user account is the administrative account. In various implementations, a processing device of the social network server 106 enables the second presentation of content by sending web page data to a client device to render a web page of the social network. A processor of the client device renders web page data to render the web page of the social network. In some implementations, a second presentation of content includes a display of circles that an administrator with access to the second user account is following. In several implementations, a second presentation of content includes a display of circles that an administrator with access to the second user account has created. In some implementations, the second presentation of content includes a display of the second identity profile.

Figure 8:
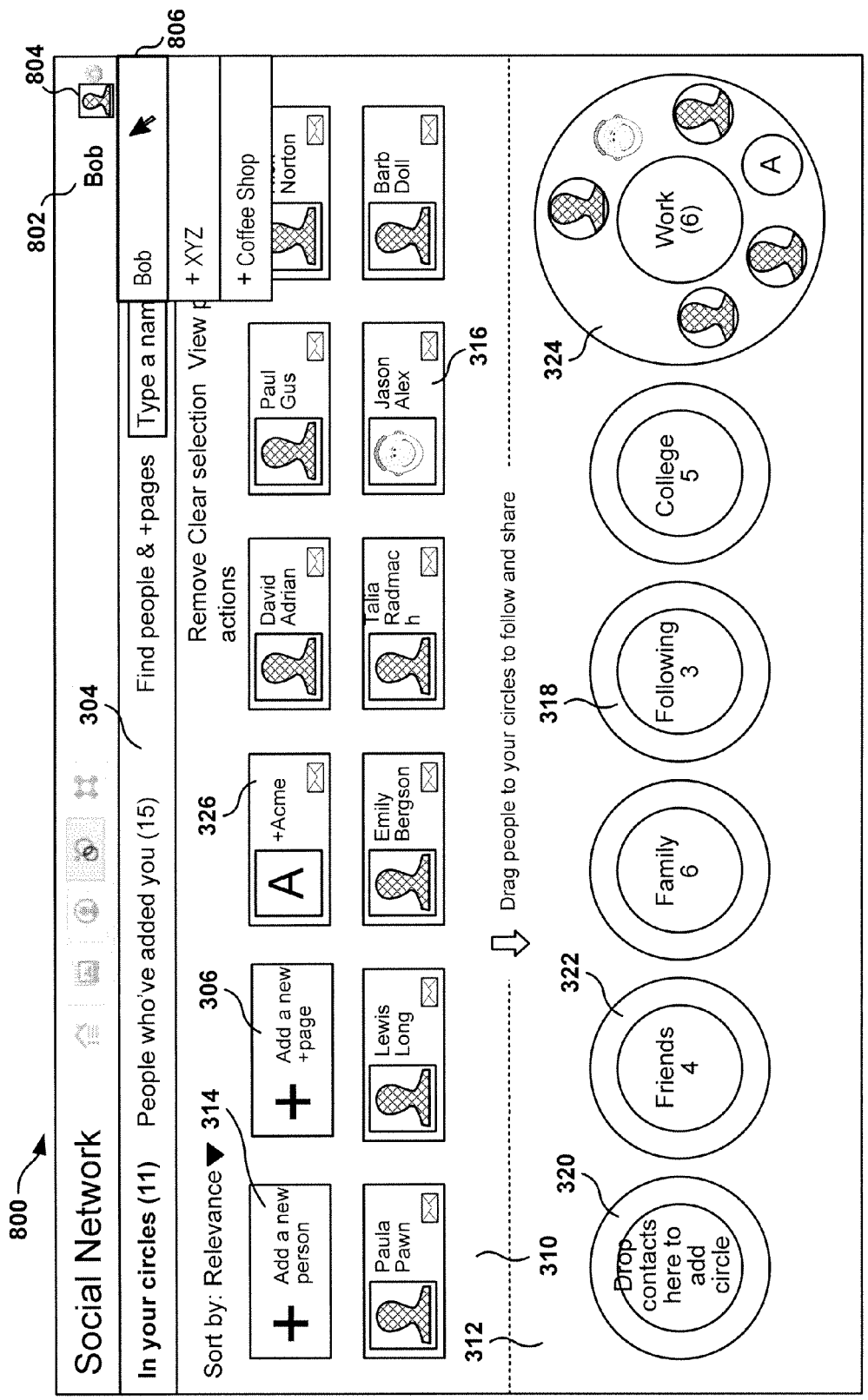
FIG. 8 shows a web page for allowing an administrator to interface with a social network, according to various implementations of the present disclosure.

FIG. 8 shows a web page 800 for allowing an administrator to interface with a social network, according to a number of implementations. The web page 800 is accessed by logging in with the first identity. It should be noted that a person is identified with a name 'Bob'. Also, the web page 800 includes a thumbnail 804 of 'Bob' and a name 802 of the person.

When an input device is used to select a location associated with a visual indicator, e.g., the name 802, the thumbnail 804, etc., a selection menu 806 is displayed on the web page 800. The selection menu 806 includes one or more roles of the person with the first identity. For example, the selection menu 806 includes a role of the person with the first identity as an administrator of XYZ company and as an administrator of a coffee shop, which is an entity. It should be noted that in some implementations, a selection menu includes any number of roles of a person.

Figure 9:
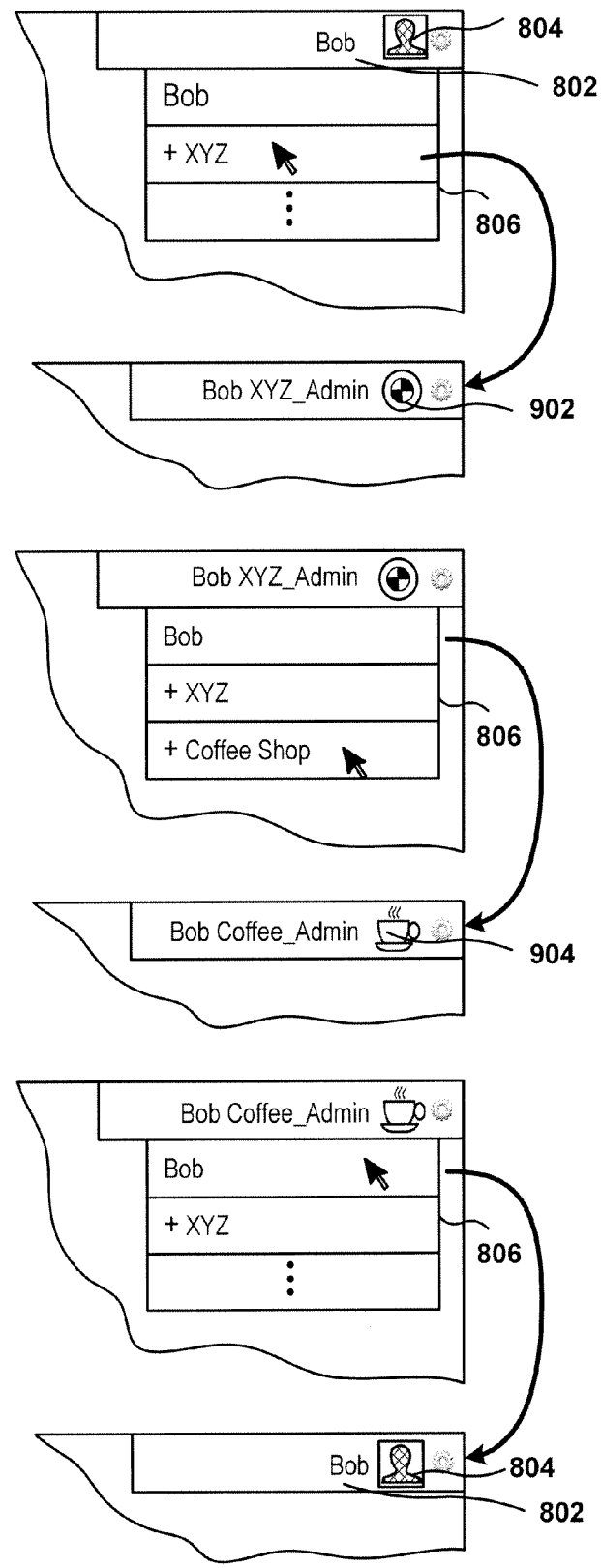
FIG. 9 shows various portions of a web page of a social network to illustrate a method for transferring from a first user account to a second user account and from the second user account to the first user account, according to some implementations of the present disclosure.

FIG. 9 shows implementations of various portions of a web page of a social network to illustrate a method for transferring from the first user account to the second user account and from the second user account to the first user account. When a user, e.g., a person named 'Bob', etc., who is acting in a personal role, selects a selection "+XYZ" on the selection 806, the web page 800 is changed by a processing device to the second presentation of content.

A portion of the second presentation of content is illustrated in FIG. 9. In this portion of the second presentation of content, the thumbnail 804 is replaced by a symbol 902 of XYZ. As illustrated in the portion, a name of 'Bob' is changed to "Bob XYZ_Admin", which illustrates that 'Bob' has a role of an administrator of XYZ company.

Moreover, when a user, e.g., an administrator named 'Bob XYZ_Admin', etc., makes a selection "+Coffee Sheep" on the selection menu 806, the second presentation of content is changed by a processing device to a third presentation of content. The third presentation of content is similar to the second presentation of content except that the third presentation of content displays a web page that includes information associated with a role of an administrator of the coffee shop, which is an example of an entity.

A portion of the third presentation of content is illustrated in FIG. 9. In this portion of the third presentation of content, the symbol 902 is replaced by a symbol 904 of the coffee shop. As illustrated in the portion, a name "Bob XYZ_Admin" is changed to "Bob Coffee_Admin", which is also an example of a name of the person named 'Bob' except that now 'Bob' has a role of an administrator of coffee shop.

Also, when a user, e.g., an administrator named 'Bob Coffee_Admin', etc., makes a selection of the name "Bob" on the selection menu 806, the third presentation of content is changed by a processing device to the first presentation of content.

A portion of the first presentation of content is illustrated in FIG. 9. In this portion of the first presentation of content, the symbol 904 is replaced by the thumbnail 804. As illustrated in the portion, a name "Bob Coffee_Admin" is changed to 'Bob', which illustrates to a user that Bob lacks an administrative role and is now acting in a personal role. In several implementations, each name or an association in a selection menu is an entry of the selection menu.

It should be noted that in some implementations, a name of a user is used by the social network server 106 to identify a user account of the social network. For example, the name 'Bob' identifies a personal account of a person outside of an administrative role. As another example, the name "Bob Coffee_Admin" identifies an administrative account of a person in an administrative role.

In some implementations, when a user logs into a user account and uses an input device to hover over multimedia on a web page of a social network, a visual identifier, e.g., multimedia, etc., is displayed by a processing device to indicate a name and/or symbol identifying the user account. For example, when a user is logged into an administrative account of a social network and hovers a cursor over an image showing cars, the processing device displays an image of a company. In this example, the user account is an administrative account and the user is an administrator of the company.

Figure 10:
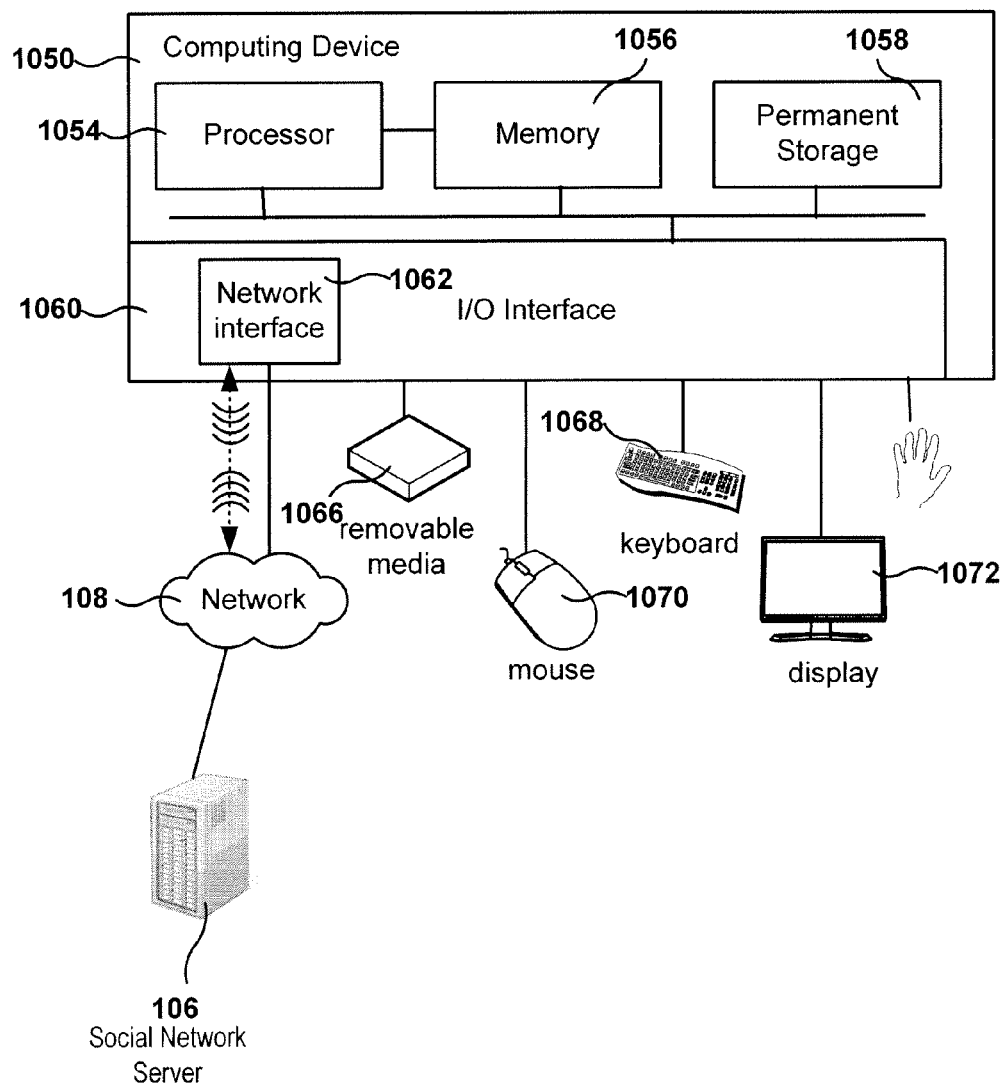
FIG. 10 is a simplified schematic diagram of a computer system for implementing various implementations of operations described in the present disclosure.

FIG. 10 is a simplified schematic diagram of a computer system for implementing some implementations of the present disclosure. It should be appreciated that the methods described herein may be performed with a digital processing system, e.g., a conventional, general-purpose computer system, etc. Special purpose computers, which are designed or programmed to perform only one function, may be used in the alternative. The computing device 1050 includes a processor 1054, which is coupled through a bus to memory 1056, permanent storage 1058, and I/O interface 1060.

Permanent storage 1058 represents a persistent data storage device, e.g., a hard drive, a USB drive, etc., which may be local or remote. Network interface 1062 provides connections via network 1064, allowing electronic messaging (wired or wireless) with other devices. It should be appreciated that processor 1054 may be embodied in a special purpose processor, a microprocessor, an application specific integrated circuit, or a programmable logic device. Input/Output (I/O) interface 1060 enables transfer of data with different peripherals and is connected with processor 1054, memory 1056, and permanent storage 1058, through the bus. Sample peripherals include display 1072, keyboard 1068, mouse 1070, removable media device 1066, etc. It should be noted that keyboard 1068, mouse 1070, and display 1072 are examples of input devices. When display 1072 acts as an input device, the display 1072 includes a touch screen.

Display 1072 is configured to render, e.g., display, etc., the user interfaces described herein. Keyboard 1068, mouse 1070, removable media device 1066, and other peripherals are coupled with I/O interface 1060 to exchange information with processor 1054. It should be appreciated that data to and from external devices may be communicated through I/O interface 1060. Implementations described in the present disclosure can also be practiced in distributed computing environments where tasks are performed by remote processing devices that are linked through a wired or a wireless network.

Implementations of the present disclosure can be fabricated as computer readable code on a non-transitory computer readable storage medium. The non-transitory computer readable storage medium holds data which can be read by a computer system. Examples of the non-transitory computer readable storage medium include permanent storage 1058, network attached storage (NAS), read-only memory or random-access memory in memory module 1056, Compact Discs (CD), Blu-ray™ discs, flash drives, hard drives, magnetic tapes, and other data storage devices. The non-transitory computer readable storage medium may be distributed over a network-coupled computer system so that the computer readable code is stored and executed in a distributed fashion.

Some, or all operations of the method presented herein are executed through a processor, e.g., processor 1054 of FIG. 10, etc. Additionally, although the method operations were described in a specific order, it should be understood that some operations may be performed in a different order, when the order of the operations do not affect the expected results. In addition, other operations may be included in the methods presented, and the operations may be performed by different entities in a distributed fashion, as long as the processing of the operations is performed in the desired way.

In addition, at least one operation of some methods performs physical manipulation of physical quantities, and some of the operations described herein are useful machine operations. Implementations presented herein recite a device or apparatus. The apparatus may be specially constructed for the required purpose. The apparatus includes a processor capable of executing the program instructions of the computer programs presented herein.

Although the foregoing implementations have been described with a certain level of detail for purposes of clarity, it is noted that certain changes and modifications can be practiced within the scope of the appended claims. Accordingly, the provided implementations are to be considered illustrative and not restrictive, not limited by the details presented herein, and may be modified within the scope and equivalents of the appended claims.

The invention claimed is:

1. A method comprising:
   receiving, using a processor, a login with a first identity associated with a first user account of a user, the first identity associated with a first set of privileges, the receiving of the login with the first identity enabling a first presentation of content associated with the first user account, the first user account being a personal account of the user;
   displaying the content on a page, the page having a visual indicator identifying the first user account, wherein the content associated with the first user account visually represents a first plurality of user groups linked to the first user account via a social network;
   receiving, using the processor, an interactive input of the user in a location associated with the visual indicator;
   causing, using the processor, an identity selection menu to be displayed on the page in response to receiving the interactive input of the user, wherein the identity selection menu comprises a second identity associated with a second user account of the user, and wherein the second user account is not a personal account of the user but an administrative account associated with an entity; and
   in response to receiving a selection by the user of the second identity via the identity selection menu, enabling, using the processor, a second set of privileges associated with the second identity and a second presentation of content associated with the second user account, wherein the second set of privileges are associated with the entity and are different from the first set of privileges, wherein the content associated with the second user account visually represents a second plurality of user groups linked to the second user account via the social network, and wherein the second presentation is different from the first presentation.

2. The method of claim 1, wherein said receiving of the login is performed after authenticating the first identity.

3. The method of claim 1, wherein the first set of privileges includes access to a plurality of functions, the plurality of functions including maintaining associations with one or more user accounts.

4. The method of claim 1, wherein said enabling the first presentation of content comprises enabling a presentation of content associated with the first identity.

5. The method of claim 1, wherein said enabling the first presentation of content comprises enabling a presentation of multimedia, the multimedia including an image, a video, an animation, or text, the multimedia associated with the first identity.

6. The method of claim 1, wherein said receiving the interactive input comprises receiving an input indicating a selection by a user, the user managing the first user account and the second user account.

7. The method of claim 1, wherein the selection menu includes a name of the first user account and a name of the second user account.

8. The method of claim 1, wherein the second set of privileges includes access to a plurality of functions, the plurality of functions including maintaining one or more associations with one or more entity accounts via an Internet.

9. The method of claim 1, wherein said enabling the second presentation comprises enabling a presentation of content that is associated with the second identity.

10. The method of claim 1, wherein said enabling the second presentation of content comprises enabling a presentation of multimedia, the multimedia including an image, a video, an animation, or text, the multimedia associated with the second identity.

11. A method comprising:
receiving, using a processor, login with an identity, the identity identifying an entity;
providing for presentation an administrative access page upon said receiving the login;
receiving, using the processor, an assignment to access a first user account, said receiving performed via the administrative access page, the first user account related to a social networking website, wherein the first user account is an administrative account associated with the entity;
sending, using the processor, a message to a computer system associated with a user to notify the user of the assignment in response to receiving the assignment;
configuring, using the processor, a user identity option corresponding to the first user account in response to receiving an acceptance of the assignment from the computer system, wherein the user identity option associates a user name of the user with the entity;
uploading the user identity option to the social networking website;
activating a user identity profile upon configuring the user identity option;
determining, using the processor, whether the user has a second user account on the social networking website based on whether the user name in the user identity option is associated with the second user account on the network; and
linking, using the processor, the first user account to the second user account in response to determining that the user has the second user account.

12. The method of claim 11, wherein said receiving an assignment access comprises receiving an authorization to access the first user account.

13. The method of claim 11, wherein the administrative account is configured to be accessed via the social networking website.

14. The method of claim 11, wherein sending the message to the computer system comprises sending an electronic messaging notification or an instant message notification to the first user account.

15. The method of claim 11, wherein the user identity option includes multimedia, the multimedia including an image, text, an animation, or a video.

16. The method of claim 11, wherein said activating a user identity profile comprises designating the user identity profile as active within an entity account.

17. A computer system comprising:
a memory device configured to store information; and
a processor coupled with the memory, the processor configured to:
receive login with a first identity associated with a first user account of a user, the first identity associated with a first set of privileges;
render content associated with the first user account, the first user account being a personal account of the user, the content associated with the first user account rendered on a page, the page having a visual indicator identifying the first user account, the content associated with the first user account rendered when the processor receives the login with the first identity, wherein the content associated with the first user account visually represents a first plurality of user groups linked to the first user account via a social network;
receive an interactive input of the user in a location associated with the visual indicator;
cause an identity selection menu to be displayed on the page in response to receiving the interactive input of the user, wherein the identity selection menu comprises a second identity associated with a second user account of the user, and wherein the second user account is not a personal account of the user but an administrative account associated with an entity;
in response to receiving a selection by the user of the second identity via the identity selection menu, enable a second set of privileges associated with the second identity, the second set of privileges associated with the entity and different from the first set of privileges; and
render content associated with the second user account, the content associated with the second user account different from the content associated with the first user account, wherein the content associated with the second user account visually represents a second plurality of user groups linked to the second user account via the social network.

18. The computer system of claim 17, wherein the selection menu includes a name of the first user account and a name of the second user account.

19. The computer system of claim 17, wherein the first set of privileges includes access to a plurality of functions, the plurality of functions including maintaining associations with one or more user accounts.

20. A system comprising:
a plurality of servers coupled via a network; and
a processor coupled with the plurality of servers via the network, the processor configured to:
receive a login with a first identity associated with a first user account of a user, the first identity associated with a first set of privileges;
render content associated with the first user account, the first user account being a personal account of the user, the content associated with the first user account rendered on a page, the page having a visual indicator identifying the first user account, the content associated with the first user account rendered when the processor receives the login with the first identity, wherein the content associated with the first user account visually represents a first plurality of user groups linked to the first user account via a social network;

receive an interactive input of the user in a location associated with the visual indicator;

cause an identity selection menu to be displayed on the page in response to receiving the interactive input of the user, wherein the identity selection menu comprises a second identity associated with a second user account, and wherein the second user account is not a personal account of the user but an administrative account associated with an entity;

in response to receiving a selection by the user of the second identity via the identity selection menu, enable a second set of privileges associated with the second identity, the second set of privileges are associated with the entity and are different from the first set of privileges; and render content associated with the second user account, the content associated with the second user account different from the content associated with the first user account, wherein the content associated with the second user account visually represents a second plurality of user groups linked to the second user account via the social network.

21. The system of claim 20, wherein the selection menu includes a name of the first user account and a name of the second user account.

22. The system of claim 20, wherein the first set of privileges includes access to a plurality of functions, the plurality of functions including maintaining associations with one or more user accounts.

* * * * *